US007693725B2

(12) United States Patent
Trout et al.

(10) Patent No.: US 7,693,725 B2
(45) Date of Patent: *Apr. 6, 2010

(54) METHOD AND SYSTEM FOR GREENHOUSE GAS EMISSIONS PERFORMANCE ASSESSMENT AND ALLOCATION

(75) Inventors: Billy L. Trout, Dallas, TX (US); Robert Broadfoot, Dallas, TX (US); Richard B. Jones, Dallas, TX (US); Michael Hileman, Dallas, TX (US)

(73) Assignee: HSB Solomon Associates, LLC, Dallas, TX (US)

( * ) Notice: Subject to any disclaimer, the term of this patent is extended or adjusted under 35 U.S.C. 154(b) by 1288 days.

This patent is subject to a terminal disclaimer.

(21) Appl. No.: 11/075,626

(22) Filed: Mar. 8, 2005

(65) Prior Publication Data

US 2006/0020502 A1    Jan. 26, 2006

Related U.S. Application Data

(63) Continuation-in-part of application No. 10/913,728, filed on Aug. 9, 2004, now abandoned.

(60) Provisional application No. 60/493,150, filed on Aug. 7, 2003.

(51) Int. Cl.
*G06Q 10/00* (2006.01)
*G05B 13/02* (2006.01)

(52) U.S. Cl. ............................. 705/1; 700/28; 700/34
(58) Field of Classification Search .................. 705/1; 700/28, 34
See application file for complete search history.

(56) References Cited

U.S. PATENT DOCUMENTS

| 5,500,795 | A |  | 3/1996 | Powers et al. |
| 5,684,964 | A |  | 11/1997 | Powers |
| 6,509,730 | B1 | * | 1/2003 | Afsah ...................... 324/158.1 |

(Continued)

FOREIGN PATENT DOCUMENTS

WO    WO 03/058386 A2    7/2003

OTHER PUBLICATIONS

Key work prectices lower refinery operating costs Oil & Gas Journal, Apr. 8, 1996, vol. 94, No. 15, p. 50.

(Continued)

*Primary Examiner*—Janice A. Mooneyham
*Assistant Examiner*—Heidi Riviere
(74) *Attorney, Agent, or Firm*—Akin Gump Strauss Bauer & Feld, LLP

(57) ABSTRACT

The present invention provides a system and method for determining equivalency factors for use in comparative performance analysis of industrial facilities by determining a target variable and a plurality of characteristics of the target variable. Each of the plurality of characteristics is ranked according to value. Based on ranking value, the characteristics are divided into categories. Based on the sorted and ranked characteristics, a data collection classification system is developed. Data is collected according to the data collection classification system. The data is validated, and based on the data, an analysis model is developed. The analysis model then calculates the equivalency factors for use in one embodiment in performance measurement and equitable benchmarking of green house gas (GHG) emissions from industrial facilities for the purposes of allocating GHG emission allowances for permits, licenses, etc.

76 Claims, 6 Drawing Sheets

U.S. PATENT DOCUMENTS

| | | | |
|---|---|---|---|
| 6,732,055 | B2 | 5/2004 | Bagepalli |
| 6,738,744 | B2 | 5/2004 | Kirovski et al. |
| 6,754,673 | B2 | 6/2004 | Horn et al. |
| 6,877,034 | B1 | 4/2005 | Machin et al. |
| 6,988,092 | B1 | 1/2006 | Tang et al. |
| 2001/0032195 | A1 | 10/2001 | Graichen et al. |
| 2002/0161624 | A1 | 10/2002 | Bradlee |
| 2003/0050814 | A1 | 3/2003 | Stoneking |
| 2003/0149613 | A1* | 8/2003 | Cohen et al. .................. 705/11 |
| 2004/0088179 | A1 | 5/2004 | Cogen |
| 2004/0143467 | A1 | 7/2004 | McAllister |
| 2004/0158478 | A1 | 8/2004 | Zimmerman |
| 2004/0215545 | A1 | 10/2004 | Murakami |
| 2004/0230443 | A1 | 11/2004 | McMorris, III |
| 2005/0283428 | A1 | 12/2005 | Bartels |

OTHER PUBLICATIONS

Brophy, William, Financial Performance: Benchmarking Chemical Markey Reporter, Apr. 7, 2003, vol. 263, No. 14, pp. 16-18.

DeVore, jay L., Probability and Statistics for Engineering and the Sciences Fourth Edition, Brooks/Code Publishing, 1995, ISBN: 0-534-24264-2.

Christian J. Colton, Keys to a Successful Carbon Dioxide Market: Program Structure and Secondary Trading, Cantor Fitzgerald Environmental Brokerage Service, pp. 61-74.

Solomon Associates, Webpage; www.sa-inc.com, Date: Jan. 11, 2006.

Resolution Integration Solution, Inc., Webpage: www.ris-resolution.com, Date: Jan. 21, 2006.

* cited by examiner

METHOD AND SYSTEM FOR GREENHOUSE GAS EMISSIONS PERFORMANCE ASSESSMENT AND ALLOCATION

CROSS-REFERENCE TO RELATED APPLICATIONS

This application is a continuation in part application and claims the benefit of U.S. application Ser. No. 10/913,728, filed Aug. 9, 2004. U.S. application Ser. No. 10/913,728 claims the benefit of provisional application U.S. Application No. 60/493,150, filed Aug. 7, 2003, which is incorporated by reference.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to comparing the performance of refining, petrochemical, power generating, distribution, and other industrial facilities.

More specifically, the invention relates to determining the equivalency factors that enable performance measurements and equitable benchmarking of greenhouse gas (GHG) emissions; which include, but are not limited to, carbon dioxide ($CO_2$), ozone ($O_3$), water ($H_2O$), hydrofluorocarbons (HFCs), perfluorocarbons (PFCs), chlorofluorocarbons (CFCs), sulphur hexafluoride ($SF_6$), methane ($CH_4$), nitrous oxide ($N_2O$), carbon monoxide (CO), nitrogen oxides (NOx), and non-methane volatile organic compounds (NMVOCs); from a facility to a form that can be directly compared to the GHG production from another facility that has different characteristics for the purposes of allocating GHG emission allowances for permits, licenses, etc.

2. Description of the Related Art

Negative environmental and health effects, such as global warming, smog, and respiratory problems in humans caused by the emission of harmful pollutants such as carbon dioxide ($CO_2$), have resulted in countries, states, and territories throughout the world regulating the amount of emissions permitted by businesses and industries. Some scientists claim that the $CO_2$ emissions are causing global warming under the theory that the emissions create a green house effect. The source of these and other emission pollutants can come from a myriad of industries, including: energy industries, such as public electricity and heat production, petroleum refining, and the manufacturing of solid fuels. Various countries have agreed to reduce their $CO_2$ emissions under the Kyoto Treaty.

The Kyoto Treaty commits industrialized nations to reducing emissions of greenhouse gases, principally $CO_2$, by around 5.2% below their 1990 levels over the next decade. To come into force, the treaty needs to be ratified by countries who are responsible for at least 55% of the world's $CO_2$ emissions. The agreement was dealt a severe blow in March 2001 when the United States announced it will not join.

A scaled-down version was drawn up four months later and finalized at climate talks in Bonn in Germany in 2002. The treaty now only needs Russian ratification to come into force. If and when the revised treaty takes effect in 2008, it will require all signatories, including 39 industrialized countries, to achieve different emission reduction targets. With that aim, it will provide a complex system which will allow some countries to buy emission credits from others. For instance, a country in western Europe might decide to buy rights or credits to emit carbon from one in eastern Europe which could not afford the fuel that would emit the carbon in the first place. The Bonn agreement also reduced cuts to be made to emissions of six gases believed to be exacerbating global warming—from the original treaty's 5.2% to 2%.

Simplistic methods, such as GHG/tonne or bbl have been used in the past to determine emission allocation. However, such methods tend to be misleading and sometimes penalize efficient facilities.

BRIEF SUMMARY OF THE INVENTION

The present invention provides a new and unique system and method for determining equivalency factors for use in comparative performance analysis of industrial facilities by determining a target variable such as a green house equivalent gas standard (Standard GHG), and a plurality of characteristics of the target variable. The characteristics are sorted and a data collection classification system is developed. The data classification system is used to quantitatively measure the differences in characteristics. Data is collected according to the data collection classification system. The data is validated, and based on the data, an analysis model is developed to compare predicted target variable to actual target variable for a set of industrial facilities. The model is used to formulate equitable benchmarking of green house gases (GHG) emissions from industrial sources for the purposes of allocating GHG emission allowances, permits, licenses, etc.

DETAILED DESCRIPTION OF THE INVENTION

The following disclosure provides many different embodiments, or examples, for implementing different features of a system and method for accessing and managing structured content. Specific examples of components, processes, and implementations are described to help clarify the invention. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
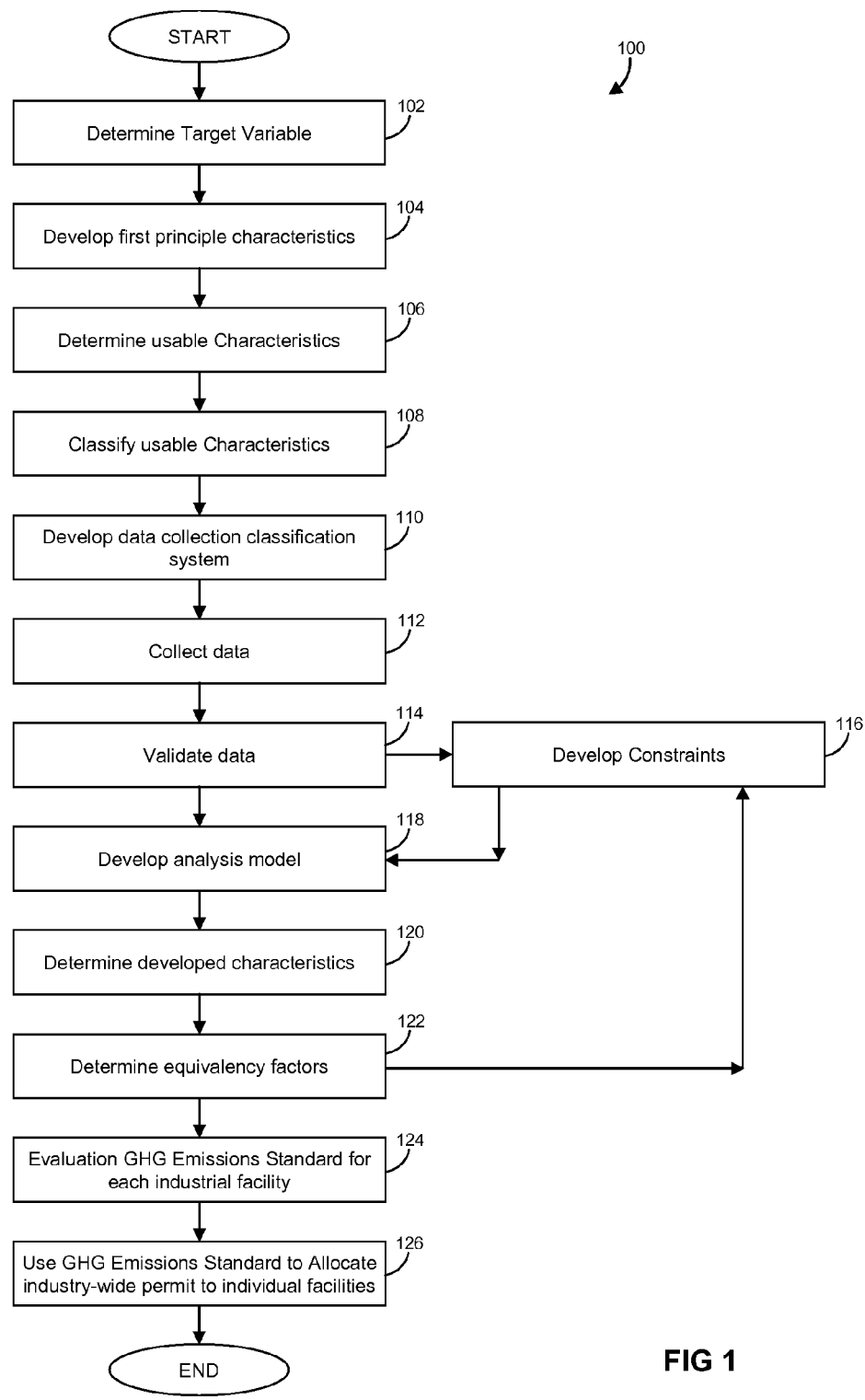
FIG. 1 is a flowchart illustrating the operation of an embodiment of the invention.

Referring now to FIG. 1, an example 100 of the operation of one embodiment of a method for determining equivalency factors for use in comparative performance analysis of industrial facilities is shown. At step 102, a target variable ("Target Variable") is selected. The target variable is a quantifiable attribute (such as the metric tons of $CO_2$ emitted from stationary combustion sources). Target Variables could be in refining, chemical (including (petrochemicals, organic and inorganic chemicals, plastics, agricultural chemicals, and pharmaceuticals), Olefins plant, chemical manufacturing, power generating, distribution, and other industrial facilities. The Target Variables could also be for different environmental aspects (such as non-$CO_2$ emissions and non-combustion $CO_2$ byproducts from specific processes). Target Variables could also be in other forms and types of industrial and commercial industries.

At step 104, the first principle characteristics are identified. First principle characteristics are the physical or fundamental characteristics of a facility or process that are expected to determine the Target Variable. Common brainstorming or team knowledge management techniques can be used to develop the first list of possible characteristics for the Target Variable. In one embodiment, all of the characteristics of an industrial facility that may cause variation in the Target Variable when comparing different manufacturing facilities are identified as first principle characteristics.

Target variables for refineries with typically be established for each of the permitted or licensed sources without limitation, catalytic cracking units, catalytic refining units, sulfur recovery units, storage vessels/tanks, fluid coking units, wastewater treatment units/streams, cooling towers, equipment leaks, blowdown systems, vacuum units, crude units, steam boilers, furnaces/heaters, compressors, turbines, vessel unloading/loading facilities, flares/thermal oxidizers, pipelines, and gasoline racks.

Target variables for power generation facilities will similarly be established for each of the permitted or licensed sources, including but not limited to, turbines, steam boilers, cooling towers, fuel storage tanks, pipelines, wastewater treatment units/streams, equipment leaks, compressors, and flares/thermal oxidizers.

Figure 2:
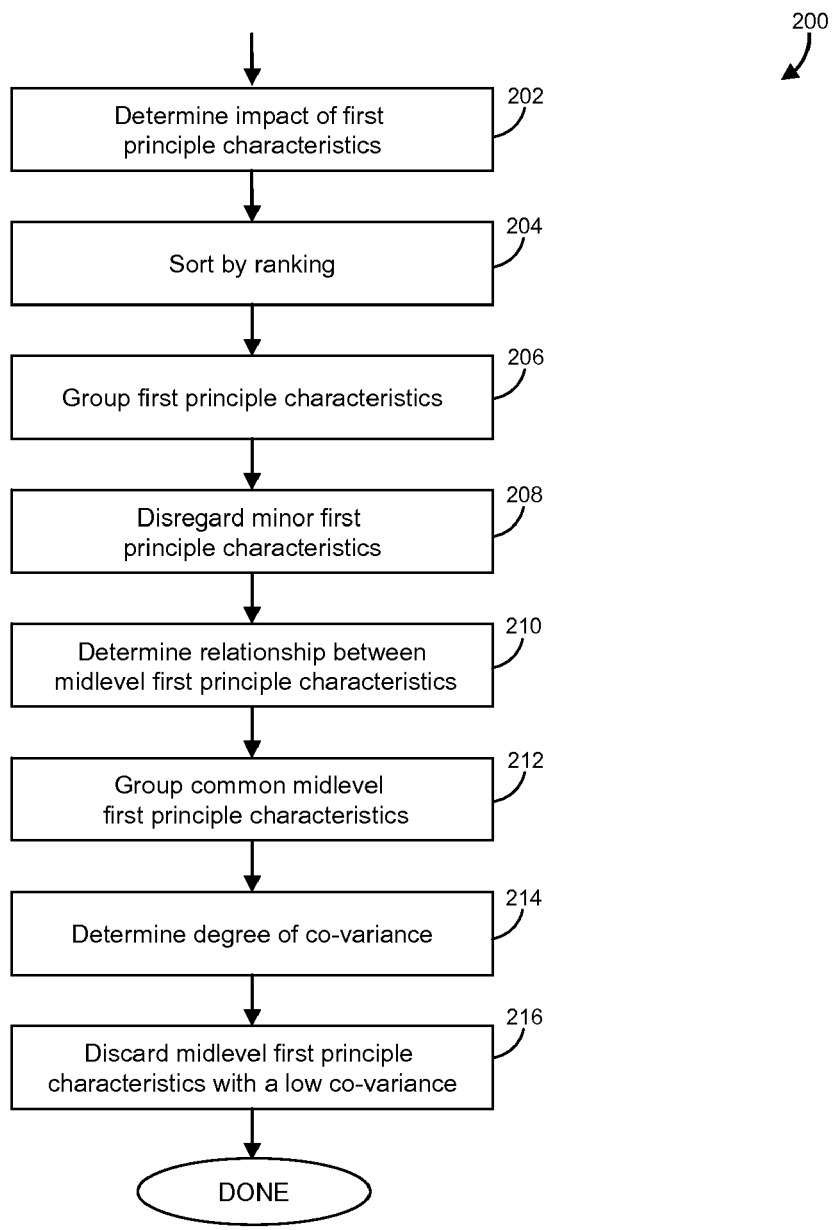
FIG. 2 is a flowchart illustrating the operation of another embodiment of the invention.

At step 106, the primary first principle characteristics are determined. As will be understood by those skilled in the art, many different options are available to determine the primary first principle characteristics. One such option is shown in FIG. 2.

At step 108, the primary first principle characteristics are classified. Potential classifications include discrete, continuous, or ordinal. Discrete characteristics are those characteristics that can be measured using a selection between two or more states, for example a binary determination, such as "yes" or "no." An example discrete characteristic could be "Type of Crude Unit." The determination of "Type of Crude Unit" is "SCU" for a standard crude unit with a nominal TBP cutpoint of bottoms greater than or equal to 600 degrees F. or "MCU" for a mild crude unit with a nominal TBP cutpoint of bottoms less than 600 degrees F. Continuous characteristics are directly measurable. An example of a continuous characteristic could be the "Feed Capacity," since it is directly measured as a continuous variable. Ordinal characteristics are characteristics that are not readily measurable. Instead, ordinal characteristics can be scored along an ordinal scale reflecting physical differences that are not directly measurable. It is also possible to create ordinal characteristics for variables that are measurable or binary. An example of an ordinal characteristic would be refinery configuration between three typical major industry options. These are presented in ordinal scale by unit complexity:

1.0 Atmospheric Distillation
2.0 Catalytic Cracking Unit
3.0 Coking Unit

Ordinal variables are in rank order, and generally do not contain information about any useful quality of measurement. In the above example, the difference between the complexity of the 1.0 unit and the 2.0 unit, does not necessarily equal the complexity difference between the 3.0 unit and the 2.0 unit.

Variables placed in an ordinal scale may be converted to an interval scale for development of equivalency factors. To convert ordinal variables to interval variables requires the development of a scale upon which the differences between units are on a measurable scale. The process to develop an interval scale for ordinal characteristic data can rely on the understanding of a team of experts of the characteristic's scientific drivers. The team of experts can first determine, based on their understanding of the process being measured and scientific principle, the type of relationship between different physical characteristics and the Target Variable. The relationship may be linear, logarithmic, a power function, a quadratic function or any other mathematical relationship. Then the experts can optionally estimate a complexity factor to reflect the relationship between characteristics and variation in Target Variable. Complexity factors are the exponential power used to make the relationship linear between the ordinal variable to the target variable resulting in an interval variable scale.

At step 110, a data collection classification system is developed. For those characteristics categorized as continuous, a data collection system that allows a quantification of the characteristics is needed. A system of definitions will need to be developed to ensure data is collected in a consistent manner. For characteristics categorized as binary, a simple yes/no questionnaire is used to collect data. A system of definitions may need to be developed to ensure data is collected in a consistent manner. For characteristics categorized as ordinal, a measurement scale can be developed as described above.

To develop a measurement scale for ordinal characteristics, at least four methods to develop a consensus function can be employed. In one embodiment, an expert or team of experts can be used to determine the type of relationship that exists between the characteristics and the variation in Target Variable. In another embodiment, the ordinal characteristics can be scaled (for example 1, 2, 3 . . . n for n configurations). By plotting the target value versus the configuration, the configurations are placed in progressive order of influence. In utilizing the arbitrary scaling method, the determination of the Target Variable value relationship to the ordinal characteristic is forced into the optimization analysis, as described in more detail below. In this case, the general optimization model described in Equation 1.0 can be modified to accommodate a potential non-linear relationship.

In yet another embodiment, the ordinal measurement can be scaled as discussed above, and then regressed against the data to make a plot of Target Variable versus the ordinal characteristic to be as nearly linear as possible. In a further embodiment, a combination of the foregoing embodiments can be utilized to make use of the available expert experience, and available data quality and data quantity of data.

Once a relationship is agreed, a measurement scale is developed. For instance, a single characteristic may take the form of five different physical configurations. The characteristics with the physical characteristics resulting in the lowest impact on variation in Target Variable will be given a scale setting score. This value may be assigned to any non-zero value. In this example, the value assigned is 1.0. The characteristics with the second largest impact on variation in Target Variable will be a function of the scale setting value, as determined by a consensus function. The consensus function is arrived at by using the measurement scale for ordinal characteristics as described above. This is repeated until a scale for the applicable physical configurations is developed.

At step 112, the classification system is used to collect data. The data collection process can begin with the development of data input forms and instructions. In many cases, data collection training seminars are conducted to assist in data collection. Training seminars may improve the consistency and accuracy of data submissions. A consideration in data collection is the definition of the industrial facility boundaries being analyzed. Data input instructions will provide definitions of what facilities, costs and staffing are to be included in data collection. The data collection input forms may provide worksheets for many of the reporting categories to aid in the preparation of data for entry.

The data that is collected can come for several sources, including existing historical data, newly gathered historical data from existing facilities and processes, simulation data from model(s), or synthesized experiential data derived from experts in the field. Additionally, no data at all can be used, in which case the determination of primary characteristics may be based on expert experience.

At step 114, the data is validated. Many data checks can be programmed into an interactive data collection system. The interactive data collection system should only accept data that passes the validation check or the check is over-ridden with appropriate authority. Validation routines may be developed to validate the data as it is collected. The validation routines can take many forms, including:

Range of acceptable data is specified
Ratio of one data point to another is specified where applicable
Data is cross checked against all other similar data submitted to determine outlier data points for further investigation
Data is cross referenced to any previous data submission
Judgment of experts After all input data validation is satisfied, the data is examined relative to all the data collected in a broad "cross-study" validation. This "cross-study" validation may highlight further areas requiring examination and may result in changes to input data.

Figure 3:
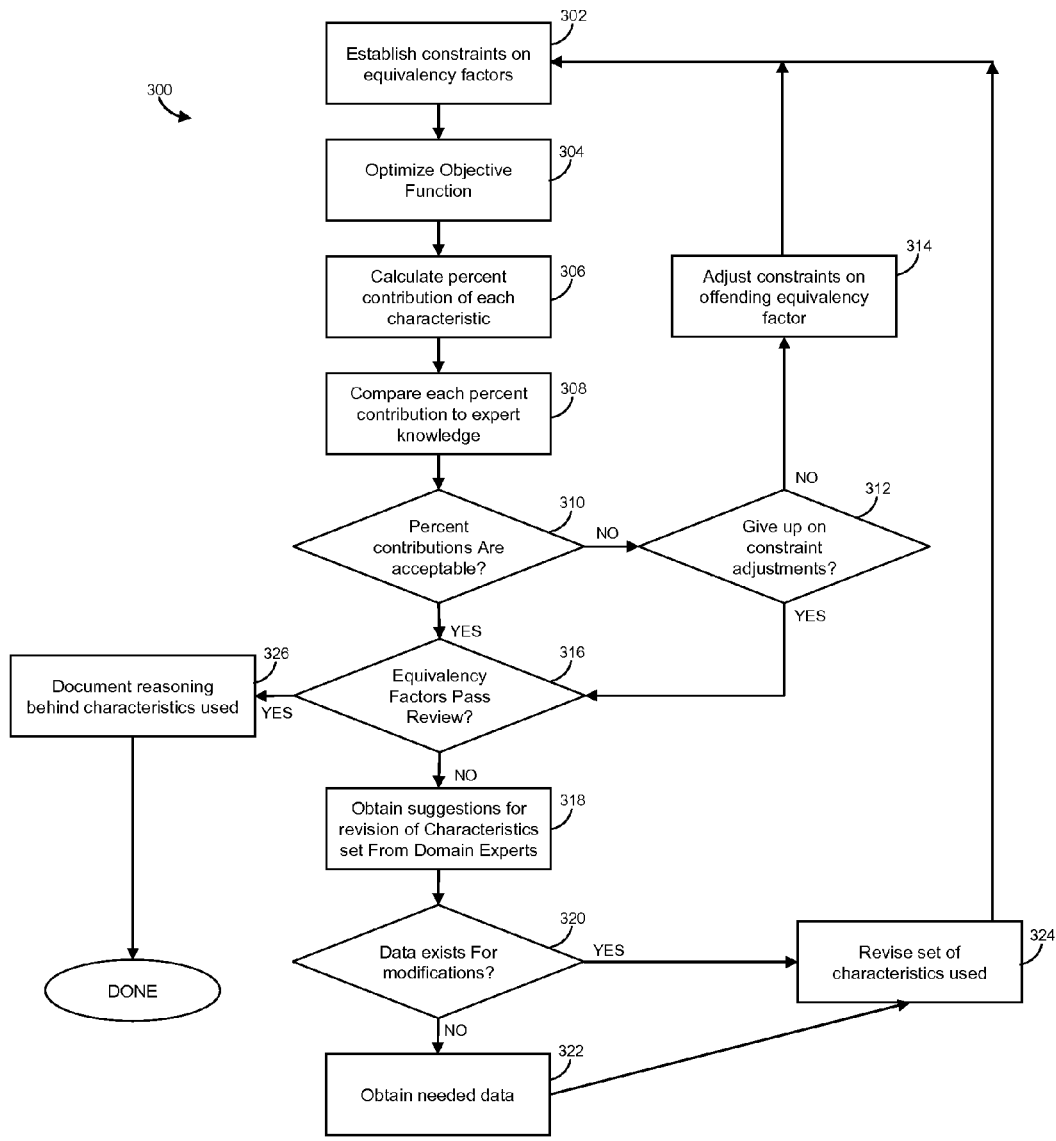
FIG. 3 is a flowchart illustrating the operation of another embodiment of the invention.

At step 116, constraints may be developed for use in solving the analysis model. These constraints could include constraints on the equivalence factor values. These can be minimum or maximum values, or constraints on groupings of values, or any other mathematical constraint forms. One method of determining the constraints is shown in FIG. 3.

At step 118, the analysis model is solved by applying optimization methods of choice with the collected data to determine the optimum set of complexity factors relating the Target Variable to the characteristics. In one embodiment, the generalized reduced gradient non-linear optimization method can be used. However, many other optimization methods could be utilized.

At step 120, developed characteristics may be determined. Developed characteristics are the result of any mathematical relationship that exists between one or more first principle characteristics and may be used to express the information represented by that mathematical relationship. In addition, if a linear general optimization model is utilized, then nonlinear information in the characteristics can be captured in developed characteristics. Determination of the developed characteristics form is accomplished by discussion with experts, modeling expertise, and by trial and refinement.

At step 122, the optimization model is applied to the primary first principle characteristics and the developed characteristics to determine the equivalency factors. In one embodiment, if developed characteristics are utilized, step 116 through step 122 may be repeated in an iterative fashion until the level of model accuracy desired is achieved.

This application of an optimization model is illustrative and by way of example only. In other embodiments, the optimization model may only be applied to primary first principle characteristics or developed characteristics.

At step 124, the Target Variable (e.g., GHG Standard) is evaluated for each industrial facility. At step 126, the GHG Standard is used to allocate industry wide permits (licenses, etc.) to individual industrial facilities.

Referring now to FIG. 2, one embodiment 200 of determining primary first principle characteristics 106 is shown. At step 202, the effect of each characteristic on the variation in the Target Variable between industrial facilities is determined. In one embodiment, the method is iteratively repeated, and an analysis model can be used to determine the effect of each characteristic. In another embodiment, a correlation matrix can be used. The effect of each characteristic may be expressed as a percentage of the total variation in the Target Variable in the initial data set. At step 204, each characteristic is ranked from highest to lowest based on its effect on the Target Variable. It will be understood by those skilled in the art that other ranking criteria could be used.

At step 206, the characteristics may be grouped into one or more categories. In one embodiment, the characteristics are grouped into three categories. The first category contains characteristics that effect a Target Variable at a percentage less than a lower threshold (for example, 5%). The second category are those characteristics with a percentage between the lower percentage and a second threshold (for example, 5% and 20%). The third category are those characteristics with a percentage over the second threshold (for example, 20%). Additional or fewer categories and different ranges are also possible.

At step 208, those characteristics with Target Variable average variation below a specific threshold may be removed from the list of characteristics. For example, this could include those characteristics in the first category (e.g., those characteristics with a percentage of less than 5%). It will be understood by those skilled in the art that other thresholds could be used, and multiple categories could be removed from the list of characteristics. In one embodiment, if characteristics are removed, the process is repeated starting at step 202 above. In another embodiment, no characteristics are removed from the list until determining whether another co-variant relationships exist, as described in step 212 below.

At step 210, the relationships between the mid-level characteristics are determined. Mid-level characteristics are characteristics that have a certain level of effect on the Target Variable, but individually do not influence the Target Variable in a significant manner. Using the illustrative categories, those characteristics in the second category are mid-level characteristics. Example relationships between the characteristics are co-variant, dependent, and independent. A co-variant relationship occurs when modifying one characteristic causes the Target Variable to vary, but only when another characteristic is present. For instance, in the scenario where characteristic "A" is varied, which causes the Target Variable to vary, but only when characteristic "B" is present, then "A" and "B" have a co-variant relationship. A dependent relationship occurs when a characteristic is a derivative of or directly related to another characteristic. For instance, when the characteristic "A" is only present when characteristic "B" is present, then A and B have a dependent relationship. For those characteristics that are not co-variant or dependent, they are categorized as having independent relationships.

At step 212, characteristics displaying dependence on each other may be resolved to remove dependencies and high correlations. There are several potential methods for resolving dependencies. Some examples include: (i) grouping multiple dependent characteristics into a single characteristic, (ii) removing all but one of the dependent characteristics, and (iii) keeping one of the dependent characteristics, and creating a new characteristic that is the difference between the kept characteristic and the other characteristics. After the dependencies are removed, the process may be repeated from step 202. In one embodiment, if the difference variable is insignificant it can be removed from the analysis in the repeated step 208.

At step 214, the characteristics are analyzed to determine the extent of the inter-relationships. In one embodiment, if any of the previous steps resulted in repeating the process, the repetition should be conducted prior to step 214. In some embodiments, the process may be repeated multiple times before continuing to step 214.

At 216, the characteristics that result in less than a minimum threshold change in the impact on Target Variable variation caused by another characteristic are dropped from the list of potential characteristics. An illustrative threshold could be 10%. For instance, if the variation in Target Variable caused by characteristic "A" is increased when characteristic "B" is present; the percent increase in the Target Variable variation caused by the presence of characteristic "B" must be estimated. If the variation of characteristic "B" is estimated to increase the variation in the Target Variable by less than 10% of the increase caused by characteristic "A" alone, characteristic "B" can be eliminated from the list of potential characteristics. Characteristic "A" can also be deemed then to have an insignificant impact on the Target Variable. The remaining characteristics are deemed to be the primary first principle characteristics.

Referring now to FIG. 3, an example embodiment 300 for developing constraints for equivalency factors is shown. In step 302. Constraints are developed on the equivalency factors, step 302. The objective function, as described below, is optimized to determine an initial set of equivalency factors, step. 304. Optimization may be performed using linear or non-linear models.

At step 306 the percent contribution of each characteristic to the target variable is calculated. There are several methods of calculating the percent contribution of each characteristic. One method is the "Average Method," which is a two step process where the Total Average Impact is calculated and then the percent contribution of each characteristic is calculated. To calculate the Total Average Impact, the absolute values of the equivalency factors times the average value of each characteristic are summed as shown below:

Average Method Equation: $TAI = \Sigma_j |\alpha_j * avg_j(F_{ij})|$

TAI=Total Average Impact
i=individual record referring to the facility
j=individual first principle or developed characteristic
$\alpha_j$=equivalency faction for the jth characteristic
F=is a function of the measured first principle characteristics or developed characteristic for a facility. In the case where the first principle characteristic is used directly, F may be 1* characteristics. In the case of a developed characteristic, F can be any function of the first principle characteristic(s) and other developed characteristic(s).
$avg_j (F_{ij})$=the average value of the measured first principle characteristics or developed characteristic over all facilities (over all j) in the analysis dataset Following the calculation of the Total Average Impact, the percent contribution of each characteristic is then calculated as shown below:

$$\text{Percent Contribution Equation: } AI_j = \frac{|\alpha_j * avg_j(F_{ij})|}{TAI}$$

$AI_j$=Average Impact of jth first principle or developed characteristic

An alternate method is the "Summation of Records Method," which calculates the percent contribution of each characteristic by calculating the individual impacts from a summation of the impacts at each individual data record in the analysis dataset of facilities as shown below:

Summation of Records Equation: $AI_j$=average over all $i \lfloor |\alpha_j * F_{ij}| / \Sigma_k |\alpha_k * F_{ik}| \rfloor$ $AI_j$=Average Impact of jth first principle or developed characteristic
i=the individual record referring to the facility
j=individual first principle or developed characteristic
k=individual first principle or developed characteristic
$\alpha j$=equivalency faction for the jth characteristic
F=is a function of the measured first principle characteristics or developed characteristic for a facility.

The Summation of Records Method may be used if non-linearity exists in the impacts. It is contemplated that other methods to calculate impacts may be used.

With the individual percent contributions developed, the method proceeds to step 308, where each percent contribution is compared against expert knowledge. Domain experts will have an intuitive or empirical feel for the relative impacts of key characteristics to the overall target value. The contribution of each characteristic is judged against this expert knowledge.

At step 310 a decision is made about the acceptability of the individual contributions. If the contribution are found to be unacceptable the process continues to step 312. If they are found to be acceptable the process continues to step 316.

At step 312, a decision is made to address how the unacceptable results of the individual contributions are to be handled. The options are to adjust the constraints on the equivalency factors to affect a solution, or to decide that the characteristic set chosen can not be helped through constraint adjustment. If the developer gives up on constraint adjustment then the process proceeds to step 316. If the decision is made to achieve acceptable results through constraint adjustment then the process continues to step 314.

At step 314, the constraints are adjusted to increase or decrease the impact of individual characteristics in an effort to obtain acceptable results from the individual contributions. The process continues to step 302 with the revised constraints.

At step 316, peer and expert review of the equivalency factors developed may be performed to determine the acceptability of the equivalency factors developed. If the factors pass the expert and peer review, the process continues to step 326. If the equivalency factors are found to be unacceptable, the process continues to step 318.

At step 318, new approaches and suggestions for modification of the characteristics are developed by working with experts in the particular domain. This may include the creation of new developed characteristics, or the addition of new first principle to the analysis data set. At step 320, a determination is made as to whether data exists to support the investigation of the approaches and suggestions for modification of the characteristics. If the data exists, the process proceeds to step 324. If the data does not exist, the process proceeds to step 322.

At step 322, additional data is collected and obtained in an effort to attempt the corrections required to obtain a satisfactory solution. At step 324, the set of characteristics are revised in view of the new approaches and suggestions.

At step 326, the reasoning behind the selection of characteristics used is documented. This documentation can be used in explaining results for use of the equivalency factors.

Figure 4:
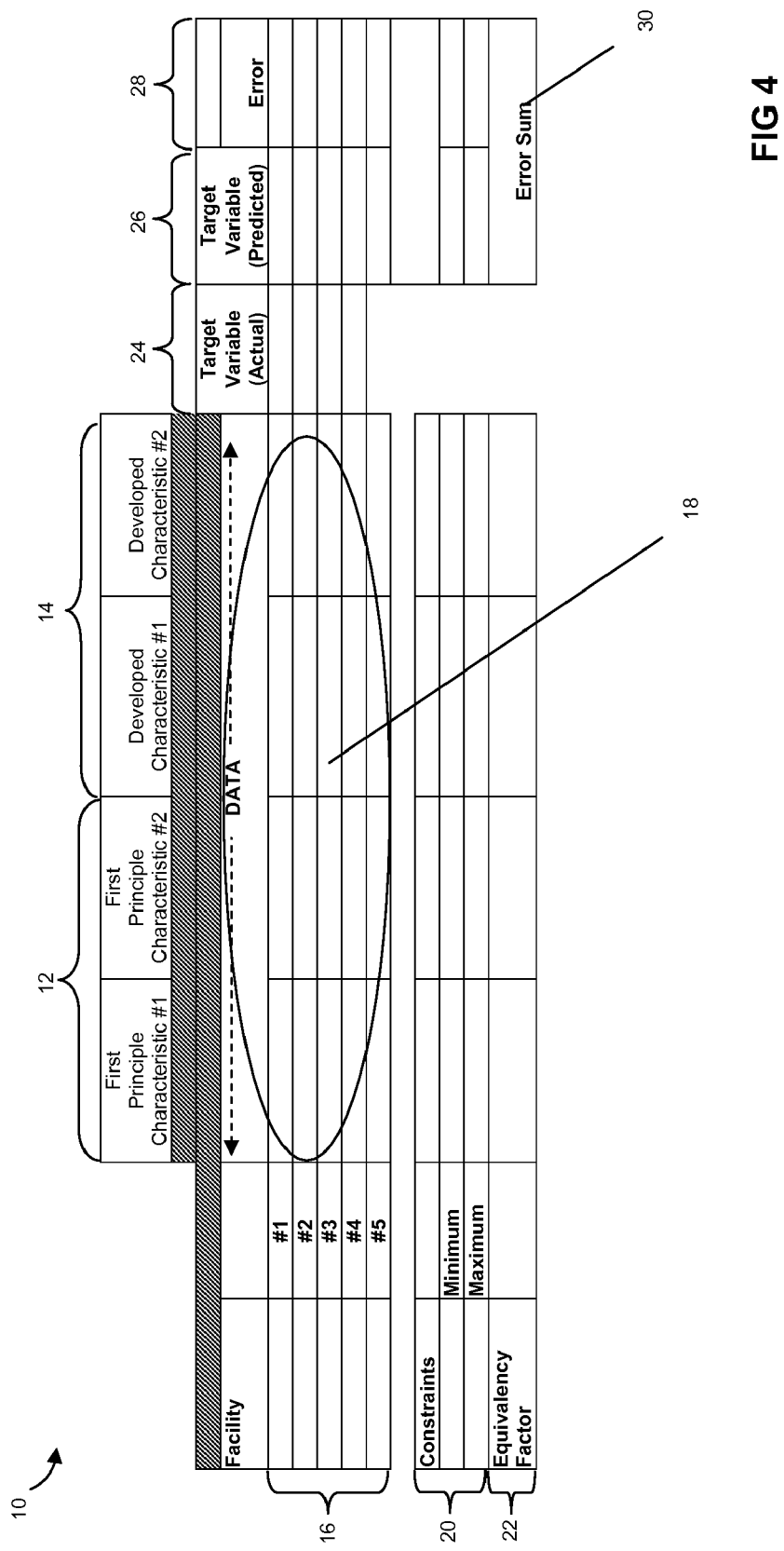
FIG. 4 is an example implementation of an embodiment of the invention.

Referring to FIG. 4, an example matrix 10 of a system for determining equivalency factors is illustrated. While matrix 10 can be expressed in many configurations, in this particular example, matrix 10 is constructed with the first principle characteristics 12 and developed characteristics 14 on one axis, and the different facilities 16 for which data has been collected on the other axis. For each first principle characteristic 12 at each facility 16, there is the actual data value 18. For each first principle characteristic 12 and developed characteristic 14, there is the equivalency factor 22 that will be computed with the optimization model. The constraints 20 limit the range of the equivalency factors 22. Constraints can be minimum or maximum values, or other mathematical functions or algebraic relationships. Moreover, constraints can be grouped and further constrained. Additional constraints on facility data, and relationships between data points similar to those used in the data validation step, and constraints of any mathematical relationship on the input data can also be employed. In one embodiment, the constraints to be satisfied during optimization apply only to the equivalency factors.

The target variable (actual) column 24 are the actual values of the target variable as measured for each facility. The target variable (predicted) column 26 are the values for the target value as calculated using the determined equivalency factors. The error column 28 are the error values for each facility as determined by the optimization model. The error sum 30 is the summation of the errors in error column 28. The optimization analysis, which comprises the Target Variable equation and an objection function, solves for the equivalency factors to minimize the error sum 30. In the optimization analysis, the equivalency factors ($\alpha_j$) are computed to minimize the error ($\epsilon_i$) over all facilities. The non-linear optimization process determines the set of equivalency factors that minimizes this equation for a given set of first principle characteristics, constraints, and a selected value.

The Target Variable is computed as a function of the characteristics and the yet to be determined equivalency factors. The Target Variable equation is expressed as:

$$\text{Target Variable equation: } TV_i = \sum_j \alpha_j f(\text{characteristic})_{ij} + \varepsilon_i$$

$TV_i$ is the measured Target Variable for facility i
characteristic is a first principle characteristic
i is the facility number
j is the characteristic number
$\alpha_j$ is the jth equivalency factor
$\epsilon_i$ is the error of the model's TV prediction as defined by:
  Actual TV value—Predicted TV value for facility i The objective function has the general form:

$$\text{Objective Function: } \text{Min}\left[\sum_{i=1}^{m} |\varepsilon_i|^p\right]^{1/p}, p \geq 1$$

i is the facility
m is the total number of facilities
p is a selected value

One common usage of the general form of objective function is for minimization of the absolute sum of error by using p=1 as shown below:

$$\text{Objective Function: } \text{Min}\left[\sum_{i=1}^{m} |\varepsilon_i|\right]$$

Another common usage of the general form of objective function is using the least squares version corresponding to p=2 as shown below:

$$\text{Objective Function: } \text{Min}\left[\sum_{i=1}^{m} |\varepsilon_i|^2\right]^{1/2}$$

Since the analysis involves a finite number of first principle characteristics and the objective function form corresponds to a mathematical norm, the analysis results are not dependent on the specific value of p. The analyst can select a value based on the specific problem being solved or for additional statistical applications of the objective function. For example, p=2 is often used due to its statistical application in measuring data and target variable variation and target variable prediction error.

A third form of the objective function is to solve for the simple sum of errors squared as given in Equation 5 below.

$$\text{Objective Function: } \text{Min}\left[\sum_{i=1}^{m} |\varepsilon_i|^2\right]$$

While several forms of the objective function have been shown, other forms of the objective function for use in specialized purposes could also be used. Under the optimization analysis, the determined equivalency factors are those equivalency factors that result in the least difference between the summation and the actual value of the Target Variable after the model iteratively moves through each facility and characteristic such that each potential equivalency factor, subject to the constraints, is multiplied against the data value for the corresponding characteristic and summed for the particular facility.

For illustrative purposes, a more specific example of the system and method for determining equivalency factors for use in comparative performance analysis as illustrated in FIGS. 1-3 is shown. The example will be shown with respect to a major process unit in most petroleum refineries, known as a Fluidized Catalytic Cracking Unit (Cat Cracker). A Cat Cracker cracks long molecules into shorter molecules in the gasoline boiling range and lighter. The process in conducted at very high temperatures in the presence of a catalyst. In the process of cracking the feed, coke is produced and deposited on the catalyst. The coke is burned off the catalyst to recover heat and to reactivate the catalyst. The Cat Cracker has several main sections: Reactor, Regenerator, Main Fractionator, and Emission Control Equipment. Refiners desire to compare the performance of their Cat Crackers to the performance of Cat Crackers operated by their competition. This Cat Cracker example is for illustrative purposes and may not represent the actual results of applying this methodology to Cat Crackers, or any other industrial facility. Moreover, the Cat Cracker example is but one example of many potential applications of the used of this invention in the refining industry.

First, at step 102, the desired Target Variable will be "GHG emissions" in a Cat Cracker facility. At step 104, the first principle characteristics that may affect GHG emissions for a Cat Cracker might be:

| | | |
|---|---|---|
| FCC Unit Capacity | Reactor Design | Feedstock Classification |
| FCC Unit Utilization | Reactor Temperature | Feedstock Gravity |
| FCC Unit Age | Catalyst Type | Feedstock Metals |
| FCC Unit Location | Percent Conversion | Feedstock Temperature |
| FCC Unit Type | Catalyst-to-Oil Ratio | Feedstock Conradson Carbon |
| Duplicate Equipment | Maintenance Practices | $C_3$ and $C_4$ Product Yield |

To determine the usable (or primary) characteristics, step 106, from the first principle characteristics, step 104, a user-defined variation in the target variable is selected as more fully described below by way of example. At step 204, the characteristics from the Cat Cracker Example are rated and ranked. The following chart shows the relative influence and ranking for the example characteristics:

| Characteristics | Category | Comment |
|---|---|---|
| FCC Unit Capacity | 3 | Little effect of scale on coke yield |
| FCC Unit Utilization | 3 | Little effect within normal ranges |
| FCC Unit Age | N/A | May affect GHG emissions performance, but not relevant to this analysis |
| FCC Unit Location | 3 | Little effect on GHG emissions performance |
| FCC Unit Type | 2 | Distinguishes between residuum, mild residuum and conventional FCC units |
| Duplicate Equipment | 3 | Little effect on GHG emissions performance |
| Reactor Design | N/A | May affect GHG emissions performance, but not relevant to this analysis |
| Reactor Temperature | 2 | Correlated with Conversion below - select only one of these two variables |
| Catalyst Type | 2 | Significantly affects coke yield |
| Percent Conversion | 1 | Significantly affects coke yield |
| Catalyst-to-Oil Ratio | 2 | Significantly affects coke yield |
| Feedstock Classification | 1 | Significantly affects coke yield |
| Feedstock Gravity | 2 | Significantly affects coke yield |
| Feedstock Metals | 2 | Significantly affects coke yield |
| Feedstock Temperature | 3 | Little effect on GHG emissions performance |
| Feedstock Conradson Carbon | 1 | Significantly affects coke yield |
| $C_3$ and $C_4$ Product Yield | 2 | Correlated with coke yield |
| Maintenance Practices | N/A | May affect GHG emissions performance, but not relevant to this analysis |

In this embodiment, the categories are as follows:

| Percent of Average Variation in the Target Variable | |
|---|---|
| | Between Facilities |
| Category 1 (Major Characteristics) | >20% |
| Category 2 (Midlevel Characteristics) | 4-20% |
| Category 3 (Minor Characteristics) | <4% |

A variable marked "N/A" is not applicable to this analysis because its effects are intentionally disregarded for the purpose of this analysis.

It is understood that other embodiments could have any number of categories and that the percentage values that delineate between the categories may be altered in any manner.

Based on the above example rankings, the characteristics are grouped according to category, step 206. At step 208, those characteristics in Category 3 are discarded as being minor. Characteristics in Category 1 and 2 must be analyzed further to determine the type of relationship they exhibit with other characteristics, step 210. Each is classified as exhibiting either co-variance, dependence or independence, step 212. As an example:

Classification of Characteristics Based on Type of Relationship

| Category 2 characteristics | Type of Relationship | If Co-variant or Dependent, Related Partner(s) |
|---|---|---|
| FCC Unit Type | Independent | |
| Reactor Temperature | Co-variant | Percent Conversion |
| Catalyst Type | Co-variant | Percent Conversion |
| Percent Conversion | Co-variant | Catalyst Type, Reactor Temperature |
| Catalyst-to-Oil Ratio | Independent | |
| Feedstock Classification | Dependent | Feedstock Conradson Carbon |
| Feedstock Gravity | Independent | |
| Feedstock Metals | Independent | |
| Feedstock Conradson Carbon | Independent | |

At step 214, the degree of the relationship of these characteristics is analyzed. Using this embodiment for the Cat Cracker example: FCC Unit Type, classified as having an Independent relationship, stays in the analysis process. Reactor Temperature and Catalyst Type are classified as having a co-variant relationship with Percent Conversion. Feedstock Classification is dependent upon Feedstock Conradson Carbon. A dependent relationship means Feedstock Classification is a derivative of Conradson Carbon. After further consideration, it is decided Feedstock Classification can be dropped from the analysis and the the more specific characteristic of Feedstock Conradson Carbon will remain in the analysis process. The three characteristics classified as having a co-variant relationship must be examined to determine the degree of co-variance.

It is determined that the change in GHG emissions is related to Reactor Temperature, Catalyst Type and Percent Conversion but that, since these are correlated, the optimization model constraints in Step 116 must be constructed to select either Percent Conversion to the exclusion of Reactor Temperature and Catalyst Type or Reactor Temperature and/or Catalyst Type to the exclusion of Reactor Temperature.

Continuing with the Cat Cracker example, and returning to FIG. 1, the remaining characteristics are categorized as continuous, ordinal or binary type measurement, step 108.

Classification of Remaining Characteristics Based on Measurement Type

| Remaining characteristics | Measurement Type |
|---|---|
| FCC Unit Type | Discrete |
| Reactor Temperature | Continuous |
| Catalyst Type | Discrete |
| Percent Conversion | Continuous |
| Catalyst-to-Oil Ratio | Continuous |
| Feedstock Classification | Discrete |
| Feedstock Gravity | Continuous |
| Feedstock Metals | Continuous |
| Feedstock Temperature | Continuous |
| Feedstock Conradson Carbon | Continuous |
| $C_3$ and $C_4$ Product Yield | Continuous |

At step 110, a data collection classification system is developed. In this example, a questionnaire is developed to assess the FCC Unit Type, Catalyst Type and Feedstock Type. The questionnaire includes clear definitions to assure that data are collected in a consistent manner. The data are used to classify each FCC Unit in one of several discrete categories.

For illustrative purposes with respect to the Cat Cracker example, at step 112, data was collected and, at step 114, validated as follows for the first five of over two hundred cat crackers studied as identified below:

Cat Cracker Data

| Number And FCC Unit Type | Feed Conversion | Feed Density | Cat-to-Oil Ratio | Feed Conradson carbon | Feed Metals | $C_3 + C_4$ Yield | Coke-on-Catalyst |
|---|---|---|---|---|---|---|---|
| | Vol. % | kg/m³ | kg/kg | Wt. % | ppm | Vol. % | kBtu/bbl |
| #1 FCC | 83.1 | 899.0 | 7.1 | 2.5 | 11.8 | 4.0 | 307 |
| #2 FCC | 77.0 | 905.3 | 5.5 | 0.3 | 11.6 | 8.0 | 201 |
| #3 FCC | 74.9 | 911.1 | 6.7 | 0.5 | 11.6 | 3.0 | 250 |
| #4 MRCC | 76.0 | 892.7 | 8.6 | 0.8 | 11.8 | 2.0 | 277 |
| #5 FCC | 76.0 | 914.0 | 6.9 | 0.8 | 11.8 | 5.0 | 255 |

Constraint ranges were developed for each characteristics to control the model so that the results are within a reasonable range of solutions.

Cat Cracker Model

Constraint Ranges

| | Feed Conversion | Feed Density | Cat-to-Oil Ratio | Feed Conradson carbon | Feed Metals | $C_3 + C_4$ Yield |
|---|---|---|---|---|---|---|
| Minimum | 0.00 | 0.00 | −1.0 | 0.0 | 0.0 | −4.0 |
| Maximum | 4.00 | 1.00 | 200 | 40.0 | 50.0 | 4.0 |

Additional constraints prevent inclusion of co-variant variables as described in paragraph [0099] above. For this embodiment, the Feed Metals content is squared to improve the accuracy of the model. Constraints on both Feed Metals squared and Feed Metals are then removed.

At step 116, the results of the model optimization runs are shown below.

Model Results

| Characteristics | Equivalency Factors |
|---|---|
| Conversion | 1.10 |
| FCC Type: FCC | −19.91 |
| FCC Type: MRCC | −21.96 |
| Feed Density | 0.53 |
| Catalyst-to-Oil Ratio | 10.13 |
| Feed Conradson Carbon | 27.93 |
| Feed Metals | 66.21 |
| Feed Metals Squared | −5.60 |

The model indicates other variables are not significant drivers of variations in coke yields between different Cat Crackers. This is indicated by the model finding zero values for equivalency factors for these two characteristics.

Figure 5:
FIG. 5 is another example implementation of an embodiment of the invention using example data.

A sample model configuration for the illustrative Cat Cracker example is shown in FIG. 5. The data 18, actual values 24, and the resulting equivalency factors 22 are shown.

This process is applied to all refinery process units that inherently combust a particular fuel. Fuel quantities and GHG emissions equivalents are determined for each such refinery process unit.

A similar process is applied to determine an energy standard for the entire refinery complex. For energy requirements that do not inherently require a particular fuel, a standard fuel type is used to evaluate the GHG emissions standard. The GHG emissions standard for purchased electric power and purchased steam can be determined by a variety of methods provided that the method selected is consistent with the method used to determine actual GHG emissions.

Standard GHG emissions from refinery flaring are determined by the industry average flaring rate.

Standard GHG emissions from hydrogen plant by-product carbon dioxide are determined by stoichiometric relationships plus allowances for losses.

Standard GHG emissions from fugitive losses are evaluated by industry standard procedures.

In step 124, a comprehensive GHG standard for the refinery is determined by summing the GHG emission standard for refinery units requiring a particular type of fuel, the GHG emission standard from the standard fuel for the refinery's other fuel requirements, the GHG emission standard for refinery flaring, the GHG emission standard for hydrogen production, and the GHG emission standard for fugitive losses. Additionally, the GHG emission standard for purchased electric power and purchased steam are included in this example to capture indirect as well as direct GHG emissions in the refinery's GHG emissions standard.

In step 126, standard GHG emissions thus calculated are summed for all refineries operating within national, regional or state boundaries. Nationwide permits for emissions to the refining industry are then allocated to individual refineries according to each refinery's GHG emissions standard. Alternatively, a business entity operating more than one refinery could receive a permit based upon the sum of GHG emissions standards determined for each of its refineries.

Figure 6:
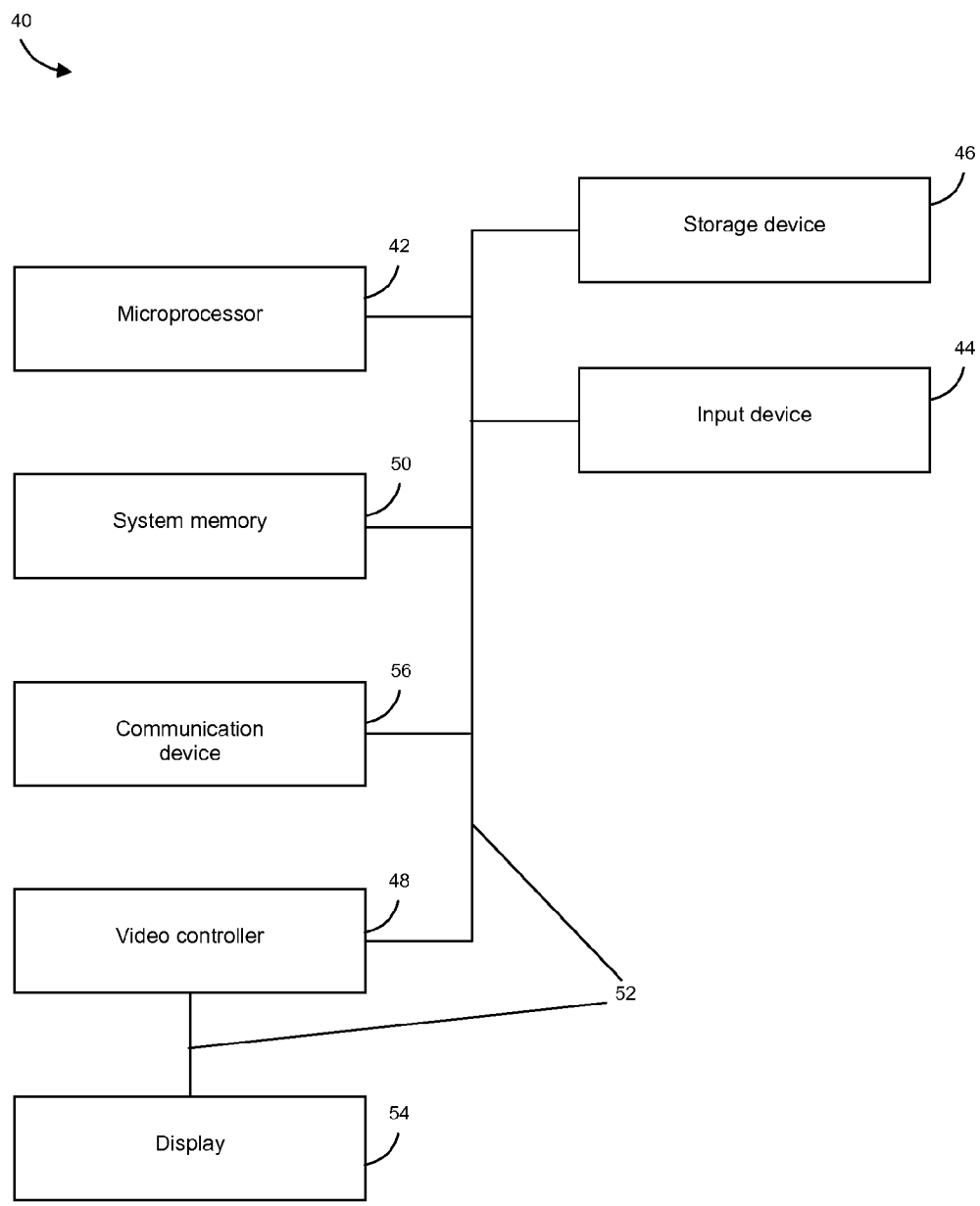
FIG. 6 is an illustrative node for implementing a method of the invention.

Referring to FIG. 6, an illustrative node 40 for implementing the method is depicted. Node 40 can be any form of computing device, including computers, workstations, hand helds, mainframes, embedded computing device, holographic computing device, biological computing device, nanotechnology computing device, virtual computing device and or distributed systems. Node 40 includes a microprocessor 42, an input device 44, a storage device 46, a video controller 48, a system memory 50, and a display 54, and a communication device 56 all interconnected by one or more buses or wires or other communications pathway 52. The storage device 46 could be a floppy drive, hard drive, CD-ROM, optical drive, bubble memory or any other form of storage device. In addition, the storage device 42 may be capable of receiving a floppy disk, CD-ROM, DVD-ROM, memory stick, or any other form of computer-readable medium that may contain computer-executable instructions or data. Further communication device 56 could be a modem, network card, or any other device to enable the node to communicate with humans or other nodes.

While the invention has been shown and described with reference to the preferred embodiment thereof, it will be understood by those skilled in the art that various changes in form and detail may be made therein without departing from the spirit and scope of the invention.

We claim:

1. A method for determining equivalency factors comprising the steps of:
    selecting a plurality of first principle characteristics;
    selecting a target variable for the first principle characteristics, wherein the target variable is a metric for greenhouse gas emissions;
    selecting a set of first principle characteristics having more than a user-specified variation in the target variable;
    determining a set of developed characteristics;
    computing a set of equivalency factors from a plurality of selected set of first principle characteristics and the set of developed characteristics,
        wherein the set of equivalency factors is computed with an equation, $\{\alpha_j, j=1 \text{ to } n\}$, using an optimization procedure,
            wherein n is the number of the selected first principle characteristics and the developed characteristics, and the optimization procedure is a linear optimization or nonlinear optimization executed by a computer processor to minimize a total error, $\{\epsilon_i, i=1 \text{ to } m\}$, between a set of actual target variable values and a set of predicted target variable values, wherein m is a number of facilities, and the set of predicted target variable values is calculated by:

$$TV_i = \sum_{j=1}^{n} \alpha_j * C_{ij} + \varepsilon_i, \; i = 1, m,$$

wherein $C_{ij}$=the first principle characteristic or developed characteristic j of the $i_{th}$ facility; and
outputting the set of equivalency factors onto a computer data medium.

2. The method of claim 1, further comprising the step of:
    ranking the plurality of first principle characteristics by their variation of the target variable.

3. The method of claim 1, further comprising the step of:
    selecting a set of first principle characteristics having less than a user-specified first principle characteristic interdependence.

4. The method of claim 1, further comprising the step of:
    selecting a set of first principle characteristics with less than a user-specified first principle characteristic co-variance.

5. The method of claim 1, wherein the set of developed characteristics comprises a user-specified function of the plurality of first principle characteristics.

6. The method of claim 1, wherein the plurality of first principle characteristics are comprised of ordinal or rank-based variables.

7. The method of claim 1, wherein the plurality of selected first principle characteristics are selected from one or more of:
    the set of first principle characteristics with more than a user-specified level of percentage target variable variation influence on the target variable,
    the set of first principle characteristics with less than a user-specified first principle characteristic interdependence, and
    the set of first principle characteristics with less than a user-specified first principle characteristic co-variance.

8. The method of claim 1, wherein the total error includes absolute error,
    wherein absolute error has the form:

$$\text{Absolute Error} = \left[\sum_{i=1}^{m} |A_i - P_i|^p\right]^{\frac{1}{p}},$$

$p \geq 1$ where:
    $A_i$=an actual value of target variable for facility i;
    $P_i$=a predicted value of target variable for facility i; and
    a selected value.

9. The method of claim 1, wherein the optimization procedure to minimize the total error incorporates range and value constraints on the set of equivalency factors.

10. The method of claim 1, wherein the plurality of first principle characteristics are attributes of refinery facilities.

11. The method of claim 1, wherein the facilities comprise one or more of:
    a catalytic cracking unit, a catalytic reforming unit, a sulfur recovery unit, a storage vessel, a fluid coking unit, a wastewater unit, a cooling tower, a blowdown system, a vacuum unit, crude unit, a steam boiler, a flare/thermal oxidizer, a pipeline, a turbine, a furnace, a compressor, a vessel loading/unloading unit, and a gasoline rack unit.

12. The method of claim 1, further comprising the step of:
    removing data outliers.

13. The method of claim 1, further comprising the step of: constraining the set of equivalency factors to predetermined ranges.

14. The method of claim 1, further comprising the step of: constraining the plurality of characteristics to predetermined ranges.

15. A system comprising:
a server, comprising:
   a processor, and
   a storage subsystem;
a database stored by the storage subsystem comprising:
   a plurality of data corresponding to equivalency factors; and
a computer program stored by the storage subsystem comprising instructions that, when executed, cause the processor to:
   select a plurality of first principle characteristics;
   select a target variable for the plurality of first principle characteristics, wherein the target variable is a metric for greenhouse gas emissions;
   select a set of first principle characteristics having more than a user-specified variation in the target variable;
   determine a set of developed characteristics,
   compute a set of equivalency factors from a plurality of selected first principle characteristics and the set of developed characteristics,
      wherein the set of equivalency factors is computed with an equation, $\{\alpha_j, j=1 \text{ to } n\}$, using an optimization procedure,
         wherein n is the number of selected first principle characteristics and the developed characteristics, and the optimization procedure is a linear optimization or nonlinear optimization executed by a computer processor to minimize total error, $\{\epsilon_i, i=1 \text{ to } m\}$, between a set of actual target variable values and a set of predicted target variable values,
         wherein m is a number of facilities, and the set of predicted target variable values is calculated by:

$$TV_i = \sum_{j=1}^{n} \alpha_j * C_{ij} + \varepsilon_i, i = 1, m,$$

wherein $C_{ij}$=the first principle characteristic or developed characteristic j of the $i_{th}$ facility; and
   output the equivalency factors onto a computer data medium.

16. The system of claim 15, the computer program further comprising instructions that, when executed, cause the processor to:
rank the plurality of first principle characteristics by their variation of the target variable.

17. The system of claim 15, the computer program further comprising instructions that, when executed, cause the processor to:
select a set of first principle characteristics having less than a user-specified first principle characteristic interdependence.

18. The system of claim 15, the computer program further comprising instructions that, when executed, cause the processor to:
select a set of first principle characteristics with less than a user-specified first principle characteristic co-variance.

19. The system of claim 15, wherein the set of developed characteristics comprises a user-specified function of the plurality of first principle characteristics.

20. The system of claim 15, wherein the plurality of first principle characteristics are comprised of ordinal or rank-based variables.

21. The system of claim 15, wherein the plurality of selected first principle characteristics are selected from one or more of:
the set of first principle characteristics with more than a user-specified level of percentage target variable variation influence on the target variable,
the set of first principle characteristics with less than a user-specified first principle characteristic interdependence, and
the set of first principle characteristics with less than a user-specified first principle characteristic co-variance.

22. The system of claim 15, wherein the total error includes absolute error,
wherein absolute error has the form:

$$\text{Absolute Error} = \left[\sum_{i=1}^{m} |A_i - P_i|^p\right]^{\frac{1}{p}},$$

$p \geq 1$ where:
$A_i$=an actual value of target variable for facility i;
$P_i$=a predicted value of target variable for facility i; and
a selected value.

23. The system of claim 15, wherein the non-linear optimization procedure to minimize the total error incorporates range and value constraints on the set of equivalency factors.

24. The method of claim 15, wherein the plurality of first principle characteristics are attributes of refinery facilities.

25. The system of claim 15, wherein the facilities comprise one or more of:
a catalytic cracking unit, a catalytic reforming unit, a sulfur recovery unit, a storage vessel, a fluid coking unit, a wastewater unit, a cooling tower, a blowdown system, a vacuum unit, crude unit, a steam boiler, a flare/thermal oxidizer, a pipeline, a turbine, a furnace, a compressor, a vessel loading/unloading unit, and a gasoline rack unit.

26. The system of claim 15, the computer program further comprising instructions that, when executed, cause the processor to:
remove data outliers.

27. The system of claim 15, the computer program further comprising instructions that, when executed, cause the processor to:
constrain the set of equivalency factors to predetermined ranges.

28. The system of claim 15, the computer program further comprising instructions that, when executed, cause the processor to:
constrain the plurality of characteristics to predetermined ranges.

29. A computer implemented method for optimizing emissions comprising the steps of:
determining a target variable for a first facility,
   wherein the target variable is a metric for greenhouse gas emissions;
identifying a plurality of characteristics of the first facility that influence the target variable;
optimizing the plurality of characteristics of the first facility that influence the target variable, wherein the optimizing is performed by a computer processor;
generating an equivalency factor as a function of at least one of the optimized plurality of characteristics of the first facility that influence the target variable comprising the step of:
minimizing an error between an actual value for the target variable and a predicted value for the target variable; and
storing the equivalency factor in a computer data medium.

30. The method of claim 29, wherein the first facility comprises one or more of:
a catalytic cracking unit, a catalytic reforming unit, a sulfur recovery unit, a storage vessel, a fluid coking unit, a wastewater unit, a cooling tower, a blowdown system, a vacuum unit, crude unit, a steam boiler, a flare/thermal oxidizer, a pipeline, a turbine, a furnace, a compressor, a vessel loading/unloading unit, and a gasoline rack.

31. The method of claim 29, wherein the step of optimizing the plurality of characteristics of the first facility that influence the target variable is performed using a non-linear optimization method.

32. The method of claim 29, wherein the step of optimizing the plurality of characteristics of the first facility that influence the target variable is performed using a linear optimization method.

33. The method of claim 29, wherein the plurality of characteristics of the first facility that influence the target variable comprises:
a plurality of first principle characteristics of the first facility that influence the target variable; and
a set of developed characteristics of the first facility, each a function of at least one of the plurality of first principle characteristics of the first facility that influence the target variable.

34. The method of claim 33, wherein the equivalency factor is a function of at least one first principle characteristic of the first facility that influences the target variable and at least one developed characteristic of the first facility.

35. The method of claim 29, wherein each of the plurality of characteristics of the first facility that influence the target variable is a function of at least one first principle characteristic of the first facility that influences the target variable.

36. The method of claim 29, further comprising the step of:
classifying the plurality of characteristics of the first facility that influence the target variable responsive to relationships among the plurality of characteristics of the first facility that influence the target variable.

37. The method of claim 36, wherein the classification of the plurality of characteristics of the first facility that influence the target variable classifies the plurality of characteristics of the first facility that influence the target variable into more than two categories.

38. The method of claim 29, further comprising the steps of:
determining a percentage variation value for each of the plurality of characteristics of the first facility that influence the target variable;
dividing the plurality of characteristics of the first facility that influence the target variable into at least two categories based on the percentage variation value; and
grouping each of the plurality of characteristics of the first facility that influence the target variable into the at least two categories responsive to a relationship among the plurality of characteristics of the first facility that influence the target variable.

39. The method of claim 29, further comprising the step of:
comparing the first facility and a second facility using the equivalency factor.

40. The method of claim 29, further comprising the steps of:
adjusting the value of the target variable for the first facility using the equivalency factor;
adjusting the value of the target variable for a second facility using the equivalency factor; and
comparing the adjusted value of the target variable for the first facility and the adjusted value of the target variable for the second facility.

41. The method of claim 29, further comprising the step of: selecting a benchmark facility.

42. The method of claim 41, further comprising the step of:
calculating a performance gap value between the first facility and the benchmark facility.

43. The method of claim 29, further comprising the step of:
calculating a performance gap value between the first facility and a second facility using the equivalency factor.

44. The method of claim 29, further comprising the step of:
classifying the first facility into a performance subgroup in accordance with the ratio of an actual target variable from the first facility to the actual target variable from the first facility adjusted using the equivalency factor.

45. The method of claim 29, further comprising the step of:
ranking the first facility and a second facility in accordance with an actual value of the target variable from the first facility adjusted using the equivalency factor and an actual value of the target variable from the second facility adjusted using the equivalency factor.

46. The method of claim 29, further comprising the step of:
calculating performance gaps using subgroups derived through the use of the equivalency factor.

47. The method of claim 29, wherein the first facility is a refinery.

48. The method of claim 29, wherein the first facility is a power generating plant.

49. The method of claim 29, further comprising the step of: removing data outliers.

50. The method of claim 29, further comprising the step of:
constraining the equivalency factor to a predetermined range.

51. The method of claim 29, further comprising the step of:
constraining the plurality of characteristics to predetermined ranges.

52. A computer implemented method for optimizing emissions comprising the steps of:
selecting a first facility,
wherein the first facility is either a refinery or a power generation plant, and
wherein the first facility comprises one or more of:
a catalytic cracking unit, a catalytic reforming unit, a sulfur recovery unit, a storage vessel, a fluid coking unit, a wastewater unit, a cooling tower, a blowdown system, a vacuum unit, a crude unit, a steam boiler, a flare/thermal oxidizer, a pipeline, a turbine, a furnace, a compressor, a vessel unloading/loading unit, and a gasoline rack;
determining a target variable for the first facility,
wherein the target variable is a metric for greenhouse gas emissions;
identifying a plurality of first principle characteristics of the first facility;
determining a percentage variation value for each of the plurality of first principle characteristics of the first facility;

dividing the plurality of first principle characteristics of the first facility into at least two categories based on the percentage variation value;

grouping the plurality of first principle characteristics of the first facility into the at least two categories responsive to a relationship among the plurality of first principle characteristics of the first facility;

selecting a plurality of first principle characteristics of the first facility that influence the target variable;

collecting data with respect to the set of first principle characteristics of the first facility that influence the target variable;

creating a set of developed characteristics of the first facility,
wherein the set of developed characteristics of the first facility is a function of one or more of the set of first principle characteristics of the first facility that influence the target variable;

optimizing the plurality of first principle characteristics of the first facility that influence the target variable and the set of developed characteristics of the first facility, using a computer processor and at least one of:
a linear optimization method and a non-linear optimization method;

generating an equivalency factor based on at least one member of the optimized plurality of first principle characteristics of the first facility that influence the target variable and the optimized set of developed characteristics of the first facility comprising the steps of:
minimizing an error between an actual value for the target variable and a predicted value for the target variable; and
removing data outliers;

constraining the equivalency factor to a predetermined range;

storing the equivalency factor in a computer data medium;

selecting a second facility; and calculating a performance gap value between the first facility and the second facility using the equivalency factor.

53. A system comprising:
a server, comprising:
a processor, and
a storage subsystem;
a computer program stored by the storage subsystem comprising instructions that, when executed, cause the processor to:
determine a target variable for a first facility,
wherein the target variable is a metric for greenhouse gas emissions;
identify a plurality of characteristics of the first facility that influence the target variable;
optimize the plurality of characteristics of the first facility that influence the target variable;
generate an equivalency factor as a function of at least one of the optimized plurality of characteristics of the first facility that influence the target variable, the computer program further comprising instructions that, when executed, cause the processor to:
minimize an error between an actual value for the target variable and a predicted value for the target variable; and
store the equivalency factor in the storage subsystem.

54. The system of claim 53, wherein the first facility comprises one or more of:
a catalytic cracking unit, a catalytic reforming unit, a sulfur recovery unit, a storage vessel, a fluid coking unit, a wastewater unit, a cooling tower, a blowdown system, a vacuum unit, crude unit, a steam boiler, a flare/thermal oxidizer, a pipeline, a turbine, a furnace, a compressor, a vessel loading/unloading unit, and a gasoline rack.

55. The system of claim 53, the computer program further comprising instructions that, when executed, cause the processor to optimize the plurality of characteristics of the first facility that influence the target variable using a non-linear optimization method.

56. The system of claim 53, the computer program further comprising instructions that, when executed, cause the processor to optimize the plurality of characteristics of the first facility that influence the target variable using a linear optimization method.

57. The system of claim 53, wherein the plurality of characteristics of the first facility that influence the target variable comprise:
a plurality of first principle characteristics of the first facility that influence the target variable; and
a set of developed characteristics of the first facility, each a function of at least one of the plurality of first principle characteristics of the first facility that influence the target variable.

58. The system of claim 57, wherein the equivalency factor is a function of at least one first principle characteristic of the first facility that influences the target variable and at least one developed characteristic of the first facility.

59. The system of claim 53, wherein each of the plurality of characteristics of the first facility that influence the target variable is a function of at least one first principle characteristic of the first facility that influences the target variable.

60. The system of claim 53, the computer program further comprising instructions that, when executed, cause the processor to:
classify the plurality of characteristics of the first facility that influence the target variable responsive to relationships among the plurality of characteristics of the first facility that influence the target variable.

61. The system of claim 60, wherein the classification of the plurality of characteristics of the first facility that influence the target variable classifies the plurality of characteristics of the first facility that influence the target variable into more than two categories.

62. The system of claim 53, the computer program further comprising instructions that, when executed, cause the processor to:
determine a percentage variation value for each of the plurality of characteristics of the first facility that influence the target variable;
divide the plurality of characteristics of the first facility that influence the target variable into at least two categories based on the percentage variation value; and
group each of the plurality of characteristics of the first facility that influence the target variable into the at least two categories responsive to a relationship among the plurality of the characteristics of the first facility that influence the target variable.

63. The system of claim 53, the computer program further comprising instructions that, when executed, cause the processor to:
use the equivalency factor to compare the first facility and a second facility.

64. The system of claim 53, the computer program further comprising instructions that, when executed, cause the processor to:
adjust the value of the target variable for the first facility using the equivalency factor;

adjust the value of target variable for a second facility using the equivalency factor; and compare the adjusted value of the target variable for the first facility and the adjusted value of the target variable for the second facility.

65. The system of claim 53, the computer program further comprising instructions that, when executed, cause the processor to:

select a benchmark facility.

66. The system of claim 65, the computer program further comprising instructions that, when executed, cause the processor to:

calculate a performance gap value between the first facility and the benchmark facility.

67. The system of claim 53, the computer program further comprising instructions that, when executed, cause the processor to:

calculate a performance gap value between the first facility and a second facility using the equivalency factor.

68. The system of claim 53, the computer program further comprising instruction that, when executed, cause the processor to:

classify the first facility into a performance subgroup in accordance with the ratio of an actual target variable from the first facility to the actual target variable from the first facility adjusted using the equivalency factor.

69. The system of claim 53, the computer program further comprising instructions that, when executed, cause the processor to:

rank the first facility and a second facility in accordance with an actual value of the target variable from the first facility adjusted using the equivalency factor and an actual value of the target variable from the second facility adjusted using the equivalency factor.

70. The system of claim 53, the computer program further comprising instructions that, when executed, cause the processor to:

calculate performance gaps using subgroups derived through the use of the equivalency factor.

71. The system of claim 53, wherein the first facility is a refinery.

72. The system of claim 53, wherein the first facility is a power generating plant.

73. The system of claim 53, the computer program further comprising instructions that, when executed, cause the processor to remove data outliers.

74. The system of claim 53, the computer program further comprising instructions that, when executed, cause the processor to:

constrain the equivalency factor to a predetermined range.

75. The system of claim 53, the computer program further comprising instructions that, when executed, cause the processor to:

constrain the plurality of characteristics to predetermined ranges.

76. A system comprising:
a server, comprising:
  a processor, and
  a storage subsystem;
a database stored by the storage subsystem comprising:
  a plurality of data corresponding to equivalency factors; and
a computer program stored by the storage subsystem comprising instructions that, when executed, cause the processor to:

select a first facility,
  wherein the first facility is either a refinery or a power generation plant, and
  wherein the first facility comprises one or more of:
    a catalytic cracking unit, a catalytic reforming unit, a sulfur recovery unit, a storage vessel, a fluid coking unit, a wastewater unit, a cooling tower, a blowdown system, a vacuum unit, a crude unit, a steam boiler, a flare/thermal oxidizer, a pipeline, a turbine, a furnace, a compressor, a vessel unloading/loading unit, and a gasoline rack;
determine a target variable for the first facility,
  wherein the target variable is a metric for greenhouse gas emissions;
identify a plurality of first principle characteristics of the first facility;
determine a percentage variation value for each of the plurality of first principle characteristics of the first facility;
divide the plurality of first principle characteristics of the first facility into at least two categories based on the percentage variation value;
group the plurality of first principle characteristics of the first facility into the at least two categories responsive to a relationship among the plurality of first principle characteristics of the first facility;
select a plurality of first principle characteristics of the first facility that influence the target variable;
collect data with respect to the plurality of first principle characteristics of the first facility that influence the target variable;
create a set of developed characteristics of the first facility,
  wherein the set of developed characteristics of the first facility is a function of one or more of the plurality of first principle characteristics of the first facility that influence the target variable;
optimize the plurality of first principle characteristics of the first facility that influence the target variable and the set of developed characteristics of the first facility,
  wherein optimization is performed using at least one of:
a linear optimization method and a non-linear optimization method;
generate the equivalency factor based on at least one member of the optimized plurality of first principle characteristics of the first facility that influence the target variable and the optimized set of developed characteristics of the first facility comprising the steps of:
  minimizing an error between an actual value for the target variable and a predicted value for the target variable; and
  removing data outliers;
constrain the equivalency factor to a predetermined range;
store the equivalency factor in the storage subsystem;
select a second facility; and
calculate a performance gap value between the first facility and the second facility using the equivalency factor.

* * * * *